(12) United States Patent
Berges et al.

(10) Patent No.: US 8,968,444 B2
(45) Date of Patent: Mar. 3, 2015

(54) CYCLIC ADSORPTION PROCESS USING PULSATION CONTROLLED COMPRESSORS

(71) Applicants: Pedro Berges, Buffalo, NY (US); Paul William Belanger, Clarence Center, NY (US); Martin Oehlbeck, Cohocton, NY (US); Andrew C. Rosinski, Orchard Park, NY (US)

(72) Inventors: Pedro Berges, Buffalo, NY (US); Paul William Belanger, Clarence Center, NY (US); Martin Oehlbeck, Cohocton, NY (US); Andrew C. Rosinski, Orchard Park, NY (US)

(73) Assignee: Praxair Technology, Inc., Danbury, CT (US)

( * ) Notice: Subject to any disclaimer, the term of this patent is extended or adjusted under 35 U.S.C. 154(b) by 102 days.

(21) Appl. No.: 13/761,510

(22) Filed: Feb. 7, 2013

(65) Prior Publication Data
US 2014/0216249 A1    Aug. 7, 2014

(51) Int. Cl.
*B01D 53/047*    (2006.01)

(52) U.S. Cl.
CPC .... *B01D 53/047* (2013.01); *B01D 2259/40007* (2013.01); *B01D 2256/12* (2013.01); *B01D 2257/102* (2013.01)
USPC ............................................................ 95/96

(58) Field of Classification Search
CPC ............. B01D 53/047; B01D 2256/12; B01D 2257/102; B01D 2259/40007
USPC ................ 96/109, 110, 116, 121, 380; 95/96; 128/205.27; 417/1
See application file for complete search history.

(56) References Cited

U.S. PATENT DOCUMENTS

| | | | |
|---|---|---|---|
| 5,957,664 A * | 9/1999 | Stolz et al. | 417/53 |
| 6,010,555 A | 1/2000 | Smolarek et al. | |
| 6,056,804 A | 5/2000 | Keefer et al. | |
| 6,451,097 B1 * | 9/2002 | Andreani et al. | 96/380 |
| 6,905,535 B2 | 6/2005 | Keefer et al. | |
| 7,695,553 B2 | 4/2010 | Celik et al. | |
| 7,766,996 B2 * | 8/2010 | Celik et al. | 95/96 |
| 7,785,405 B2 | 8/2010 | Manning et al. | |
| 7,819,223 B2 | 10/2010 | Celik et al. | |
| 2012/0325085 A1 | 12/2012 | Belanger et al. | |
| 2013/0323014 A1 * | 12/2013 | Rosinski et al. | 415/1 |

* cited by examiner

*Primary Examiner* — Frank Lawrence
(74) *Attorney, Agent, or Firm* — Salvatore P. Pace

(57) ABSTRACT

The present invention relates generally to a cyclic adsorption process for separating components of a gas stream with at least one adsorber vessel containing at least one adsorber bed undergoing the steps of at least pressurization and depressurization such that the steps are driven by at least one compressor, the compressor undergoing the steps of acceleration and deceleration in association with the steps of pressurization and depressurization. The compressor is operated at or above predetermined speeds which do not generate undesirable frequency pulsations while meeting the requirements of the cyclic adsorption process.

20 Claims, 1 Drawing Sheet

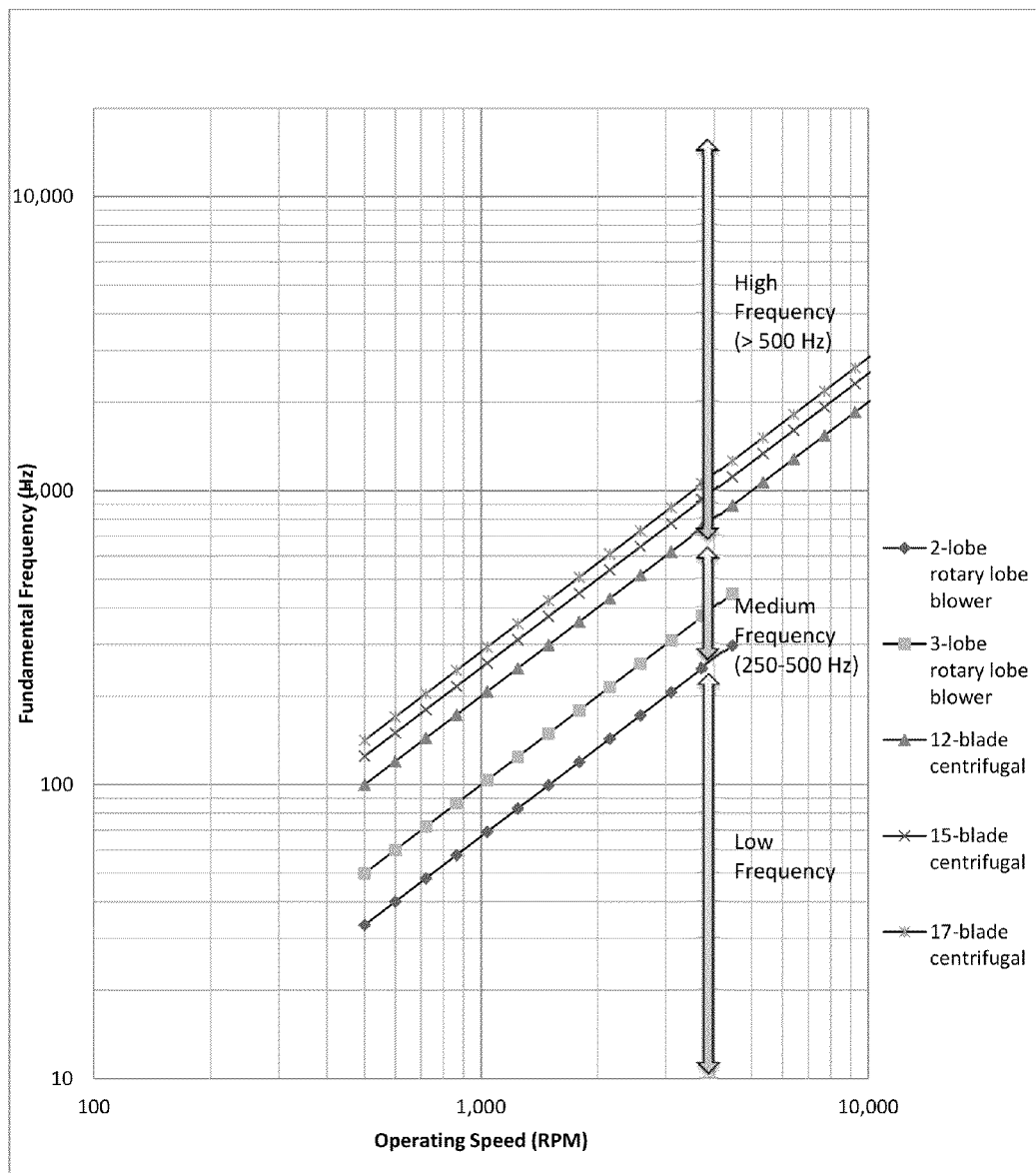

CYCLIC ADSORPTION PROCESS USING PULSATION CONTROLLED COMPRESSORS

FIELD OF THE INVENTION

The present invention relates generally to an improved cyclic adsorption process for separating components of a gas stream using pulsation controlled compressors. More particularly, the present invention is directed to cyclic adsorption processes using compressors operated under conditions that eliminate low, and preferably low and medium range frequency pulsations and the noise and vibrations generated as a result of these pulsations.

BACKGROUND OF THE INVENTION

Cyclic adsorption or separation processes are well known and are typically used to separate a more adsorbable component from a less adsorbable component. The cyclic adsorption process employs a selective adsorbent to remove at least one component of a gas mixture and employs at least pressurization and depressurization steps, but more typically employs: (1) adsorption, (2) depressurization, (3) purge and, (4) pressurization steps. The feed gas containing the more readily adsorbable component and a less readily adsorbable component is passed through at least one adsorbent bed capable of selectively adsorbing the more readily adsorbable component at a predetermined (higher) adsorption pressure. The gas stream exiting the bed is concentrated in the less readily adsorbable component and is removed as product. When the bed becomes saturated with the readily adsorbable component, the bed is depressurized to a lower pressure for desorption of the readily adsorbable component so that this component can be selectively removed from the process.

Examples of such cyclic adsorption processes include but are not limited to pressure swing adsorption (PSA); vacuum swing adsorption (VSA); vacuum pressure swing adsorption (VPSA), all of which use a low pressure or a vacuum and a purge gas to regenerate the sorbent; temperature swing adsorption (TSA), which uses a thermal driving force such as a heated purge gas to desorb the impurities; and various variations of these processes. These adsorption processes are generally used to separate: oxygen or nitrogen from air; hydrocarbons and/or water vapor from feed air gases; hydrogen from carbon monoxide; carbon oxides from other gas mixtures; and other similar separations.

The cyclic adsorption processes useful herein will have at least one vessel containing at least one adsorbent bed therein (herein described as an "adsorber vessel" and an "adsorber bed", respectively) and the adsorber bed can have one or multiple layers and various types of adsorbents. The processes can include the separation of gases for a wide variety of applications such as used to separate contaminates from end products in the air separation, refining, natural gas, chemical and petrochemical industries. Preferably, these processes are PSA, VSA, and VPSA air separation processes and most preferred is a VPSA air separation process to produce oxygen from air.

Adsorbents suitable for such adsorption or separation processes are well known and include molecular sieves, aluminas, silicas, zeolites, with and without binders, and the like. For the preferred PSA, VSA, and VPSA air separation processes, suitable adsorbents include, but are not limited to, A, X, and Y type zeolites, various ion exchanged forms of these zeolites, and silica-alumina, alumina, silica, titanium silicates, phosphates and mixtures thereof.

Cyclic adsorption plants for the separation of gases generally require industrial size compressors, also known as blowers, and associated equipment to pressurize and evacuate the adsorbent beds. Such compressors typically generate a wide range of frequency pulsations with associated levels of radiated noise generated by the pulsations. The noise is also generated by the pulsation induced vibrations of the equipment and by the gas flowing through the compressor and overall system. These pulsations are characterized by their frequency and wavelength. Frequency depends on the operating speed and specific design characteristics of the compressors, while wavelength (the speed of sound divided by the frequency) is a function of the pressure, temperature, and gas composition. The pulsations are also a function of the machine type; size; number of lobes or blades or other active components; and, most importantly, the speed of operation. For each compressor type, there is a speed range of operation that generates pulsations at various frequencies.

Conventional cyclic adsorption plants, such as a VPSA plant, most often use rotary type positive displacement compressors which are known to generate pulsation frequencies in the lower range such as about 20 Hertz (Hz) to about 450. Higher frequency pulsations are also possible depending on the specific design characteristics and operational parameters of the compressor. Dynamic displacement compressors, such as centrifugal or axial compressors, have been proposed for use in such applications, based on new designs and improved capability. These compressors also generate pulsations, but often operate at different speeds causing different ranges of frequency pulsations.

Such pulsations are considered undesirable since the noise levels (sound waves) generated or otherwise associated with these pulsations result in undesirable conditions. High noise levels are considered a safety concern and acceptable levels are often governed by environmental regulations or ordinances where the cyclic adsorption plants are located. While plant noise levels can easily range from 170 to 180 A-weighted decibels (dBA), such regulations or ordinances typically require the sound levels to be less than 90 dBA and often less than 85 dBA over a 24 hour period. Even within these environmental requirements, plant workers must still wear protective equipment to protect their hearing and local residents remain subjected to nuisance levels of ambient noise at or near the plant fence line. Thus, noise attenuation is often required to meet environmental and regulatory requirements.

In addition, certain frequency pulsations, generally in the low to medium range, cause vibrations that can fatigue and otherwise damage pipes, pipe couplings, adsorber vessels, adsorber beds, adsorbent materials, valves, and associated equipment thereby requiring increased maintenance and equipment costs. These low to medium range frequencies generate harmonic frequencies at multiples of the fundamental frequency produced, thereby contributing to the total power (dBA level) of the noise and the magnitude of the vibrational effects. For this reason, cyclic adsorption plants often require special piping systems and equipment designs to address these pulsation effects resulting in adding costs and additional operating considerations.

To reduce pulsations and the associated radiated noise and vibrational effects from the operation of the plants, conventional cyclic adsorption plants employ sound attenuation equipment known as "silencers". One or more of these silencers are placed at the feed and/or discharge of each compressor/blower to reduce the pulsation effects. For example, U.S. Pat. No. 7,819,223 illustrates a conventional VPSA air separation plant with the required silencer to decrease noise. Such silencers are commercially available and include a cylindrical steel-shell type having multiple chambers, Helmholtz resonator type pulsation dampeners, and partially buried chambers with impedance tubes and baffles to provide noise attenuation. Silencers taught for use in cyclic adsorption plants are also described by U.S. Pat. No. 7,695,553. Such silencers attenuate low frequency pulsations using reactive components/chambers and attenuate medium and high frequency pulsations using sound absorbing components/chambers. The reactive components or chambers primarily provide peak noise reduction in the frequency range of less than 250 Hz (low range) and the absorptive components or chambers provides peak noise reduction in the frequency range from about 250 to 500 Hz (medium range). One drawback with the use of reactive type silencers is that they cause a considerable pressure drop associated with the cross sectional discontinuities required for low frequency noise attention. These pressure drops must be addressed in the process design resulting in additional power consumption and lost process efficiencies. For example, in a typical VPSA plant the pressure drop resulting from the reactive components in the feed inlet and vacuum discharge silencers can be as high as 0.25 psid per silencer. This pressure drop must be overcome by operating the compressors to raise the pressure ratios required for operating at the necessary process conditions. Typically, the pressure drop caused by the reactive type silencers results in approximately 5 percent higher power consumption in a typical VPSA process.

Further, as cyclic adsorption plants become larger, these silencers must also become larger in both length and diameter, to provide the necessary sound attenuation. Large silencers significantly increase plant costs, are more prone to vibrational and mechanical failure, and increase the overall footprint of the plant, requiring additional land property that is not always available. Occasionally, silencers for these larger plants will still not meet the requirements for attenuated pulsations and associated noise, which results in requiring additional noise abatement techniques, such as the use of buildings, noise enclosures, and acoustic insulation systems.

Thus, the costs of manufacturing, installing, and maintaining silencers and the operation of the plant with such silencers, with the resulting pressure drop, become a significant capital and operating consideration and can add significantly to the cost of designing and operation such plants. By removing or reducing the size of such silencers, significant capital and operating savings can be achieved.

It has now been found that the compressors used in cyclic adsorption processes can be operated under conditions which meet the operational requirements of the cyclic adsorption process, but can be controlled to operate under conditions that eliminate low and, preferably, low and medium frequency pulsations. According to this invention, the compressor can be operated at predetermined speeds which do not generate low range frequency pulsations eliminating the need for reactive type silencers and reducing the needs for absorptive type silencers. For example, the passive silencers (e.g., non-reactive absorptive type) may be smaller or less rigorously constructed, and therefore require less expensive materials. In a preferred mode of operation, using the preferred centrifugal compressor, low and medium range frequency pulsations can be eliminated and the plant is operated in the absence of either a reactive or passive (sound absorbing) type silencers.

BRIEF SUMMARY OF THE INVENTION

According to one embodiment of this invention, the compressors can be operated in the cyclic adsorption process under conditions that remove the need for reactive type silencers. In another embodiment, the compressors are operated under conditions that remove the need for any reactive type or passive type silencers.

According to one embodiment of this invention, a cyclic adsorption process is provided for separating components of a gas stream comprising at least one adsorber vessel containing at least one adsorber bed undergoing the steps of at least pressurization wherein the steps are driven by at least one compressor that is operated at or above a predetermined speed which does not generate low range frequency pulsations.

In another embodiment, a cyclic adsorption process for gas separation is provided comprising (1) compressing a feed gas using at least one feed compressor; (2) introducing the feed gas into at least one vessel containing at least one adsorber bed including at least one adsorbent material, the feed gas comprising at least one less readily adsorbable component and at least a more readily adsorbable component; (3) passing the feed gas through the at least one adsorbent material such that the more readily adsorbable component is adsorbed by the at least one adsorbent material; and (4) withdrawing a product gas enriched in the more readily adsorbable component using at least one vacuum compressor; wherein the feed compressor and the vacuum compressor are each operated at speeds eliminating low range frequency pulsations, and preferably both low range and medium frequency pulsations.

As used herein, the elimination of undesirable frequency pulsations can also be stated as the operation of the compressors under conditions that generate only frequency pulsations above 250 Hz, and, preferably above 500 Hz, thereby eliminating low and medium range frequency pulsations.

BRIEF DESCRIPTION OF THE DRAWINGS

For a more complete understanding of the present invention and the advantages thereof, reference should be made to the following exemplary drawing in which:

FIG. 1 is a descriptive log-log plot indicating the fundamental frequency ranges associated with the operating speed of two compressor types; rotary lobe blowers and centrifugal compressors, both known to be used for cyclic adsorption processes.

DETAILED DESCRIPTION OF THE INVENTION

The present invention is a cyclic adsorption process using compressors which operates under predetermined conditions that eliminates certain frequency pulsations generated in the process under normal operation. The compressors in the plant are operated at predetermined speeds and under conditions that do not generate low, and preferably, low and medium range frequency pulsations. A typical cyclic adsorption process described herein is one that utilizes operation of a compressor, preferably a centrifugal compressor, to meet the required pressurization and depressurization steps in the process. Acceleration generally occurs during the steps of pressurization and evacuation. Deceleration generally occurs when rapid changes in vessel pressure, such as during falling pressure equalization, results in decreasing pressure ratios. For example, in single bed oxygen VPSA systems, deceleration will occur in the following process steps: oxygen recovery depressurization, oxygen recovery overlap evacuation, oxygen recovery overlap feed, and product pressurization overlap feed. In multiple bed oxygen production systems, deceleration will occur in the steps of: falling pressure equalizations, falling pressure evacuations with overlap equalization, falling pressure evacuations, raising pressure evacuations with overlap equalization, rising pressure feedings with overlap equalization, and rising pressure feedings with overlap product pressurization.

The cyclic adsorption and separation processes of this invention can employ one or more compressors which can be used for the feed/intake, the product/discharge, or for both. These compressors and the associated adsorption process utilize either a rotary lobe compressor operated at constant speeds and/or a variable speed centrifugal compressor operated at variable speeds (the pressurization and depressurization steps in the process are conducted via the acceleration and deceleration of the speed of the rotation of the compressor blades).

Some cyclic processes will have additional steps or multiple adsorber beds. If the plant contains two or more adsorber vessels, each vessel undergoes the above steps; however, the vessels are typically operated out of phase so that while one vessel is producing product the other is being regenerated. For example, U.S. Pat. No. 6,010,555 describes such a 2-bed cycle. In a two adsorber bed process, two compressors may be used such that one is dedicated to feeding gas to the first adsorber vessel, while the other is dedicated to evacuating gas from the second adsorber bed. Other multiple adsorber bed processes are known which use multiple compressors for pressurization, evacuation, repressurization and equalization steps.

Regardless of the number of vessels, the pressures and flows within the process quickly change as the process cycles from the adsorption to desorption steps. Generally, the pressure of a vessel will change from a low pressure condition of at or below atmospheric, such as about 6 to 8 psia, to a high pressure condition above atmospheric, such as about 19 to 24 psia, in a rapid periodic cycle time, e.g., in less than one minute. Some processes can require even wider spans of pressures and/or vacuums in similar rapid cycle times.

The most preferred process is a VPSA process that separates oxygen from air. Such a typical VPSA is one wherein one or more adsorber vessels having at least one adsorber bed undergoes the following steps:

1) the adsorber bed is pressurized to a desired pressure wherein nitrogen is readily adsorbed by the adsorbent as the feed air is passed across the bed;

2) product gas rich in oxygen is produced as the nitrogen in the feed air is adsorbed;

3) the bed containing the adsorbent is evacuated to a low pressure (typically under vacuum) wherein the adsorbed nitrogen is desorbed from the adsorbent in the adsorber bed; and, preferably, 4) a purge gas is passed through the adsorber bed to remove any remaining nitrogen.

Conventional VPSA process includes at least one adsorber bed that swings between adsorption and desorption cycles. During a desorption step, the bed is connected to the compressor which causes the adsorbed gas to desorb and to be discharged as waste gas. A typically rotary lobe type compressor used in a conventional process displaces a large quantity of gas from the inlet to the outlet via pockets existing between its lobes and casing at relatively constant volume. The flow of gas in and out of such compressors in this manner is not steady, but rather is a discrete (or intermittent) action. Due to pressure differences between the gas pockets and outlet piping, every time the rotor tips clear the housing, pressure fluctuations are created. Such fluctuations create primarily low frequency pulsations and often medium frequency pulsations and the associated resulting vibration and noise.

Cyclic adsorption plants typically employ silencers at the discharge of vacuum compressor/blower to reduce the pulsations and the generated noise associated with the equipment and gas discharge. Silencers are also used as inlet silencers and positioned upstream of a feed compressor. Such silencers normally contain both reactive and passive (absorptive) components and chambers. When the silencer is connected to the discharge of vacuum compressor, gas from the vacuum compressor enters the silencer through a reactive chamber and leaves the silencer through an absorptive chamber. When the silencer is connected to the intake of a feed compressor, gas from the atmosphere enters the silencer through an absorptive chamber and leaves the silencer through the reactive chamber into the compressor.

As described above, the present process uses compressors that are operated under rapidly changing conditions and wherein the compressor is operated at predetermined speeds which do not generate low and preferably low and medium, range frequency pulsations. As used herein, low frequency pulsations are those that are generated at less than about 250 Hz (0 to 250 Hz), medium frequency pulsations are those that are generated from about 250 to about 500 Hz and high frequency pulsations are those that are generated at frequencies of greater than about 500 Hz. The elimination of low range frequency pulsations eliminates the need for silencers that employ reactive components and/or chambers and the elimination of medium range frequency pulsations removes the need for silencers that employ absorptive type components and/or chambers (passive type) with the materials especially designed for these medium range frequencies. As is understood by the skilled person, these frequency pulsation ranges will likely overlap slightly in practice and that small variations within the ranges specified above should not be considered outside the scope of this invention.

High frequency pulsations generally do not need to be attenuated under normal operating conditions. However, when necessary, these high frequency pulsations can be attenuated with conventional muffler type sound absorbing systems with minimal pressure drop effects. Such venting, silencers, and enclosures are similar to those described in U.S. Pat. No. 7,819,223 and are typically much smaller and inexpensive when used for treating higher frequency noise and the components are comprised of thin stock grade metals and/or plastics. High frequency pulsation generated noise also decays more rapidly in the atmosphere due to associated frictional losses in comparison to low and medium frequency pulsation generated noise and are not considered as undesirable.

The present invention makes it possible to comply with strict noise requirements. The standards are dependent upon on location, and in the United States, these standards are regulated primarily by OSHA for industry, and often by local zoning ordinances and neighborhood committees such as CAP's (committee action pacts). One such OSHA standard that applies is 29 CFR 1910.95 which requires that no worker be exposed to a dBA level of greater than 90 during a time weight averaged 8 hour workday.

A wide range of compressors can be used in cyclic adsorption type processes of this invention including positive displacement compressors including, but not limited to, reciprocating, piston, rotary vane, rotary screw, or rotary lobe compressors and dynamic displacement compressors such as axial flow and centrifugal compressors. The most common compressors proposed for use in such processes are the rotary lobe type and the centrifugal type compressors which are the preferred compressor types used with this invention. Most preferred are the centrifugal compressors that can be operated at speeds that do not generate the undesirable frequency pulsations (low or medium range frequency pulsations). The rotary lobe compressors can have various designs and typically have 2 or more lobes. The centrifugal compressors can have single or multiple stages and a varying number of impellers or blade and impellers/blade configurations. Moreover, these compressors can be driven by a wide range of motor types, but are generally capable of high speeds and rapid speed changes and can be single or multiple phase, direct or variable drive, air or fluid cooled, and oil lubricated or oil-free. The preferred drive systems for the centrifugal compressors are more fully described below.

Recently, applicants proposed the use of centrifugal machines capable of meeting the rigorous requirements of rapid cyclic conditions in place of traditional rotary lobe type compressors commonly used in such applications. For example, U.S. Pat. No. 7,785,405B2, which is incorporated herein by reference, discloses systems and processes for gas separation using high-speed permanent magnet variable-speed motors to accelerate and decelerate centrifugal compressors used in cyclic adsorption type processes. Centrifugal compressors can also be operated at speeds or under conditions that generate these undesirable frequency pulsations.

Eliminating low and medium range frequency pulsations is achieved by operating each type of compressor at or above a predetermined operating speed as determined for each compressor type. These operating speeds can be readily identified by one skilled in the art without the need for undue experimentation. The operation of these compressors is therefore controlled so that they operate efficiently, provide the needed compression, and do not generate low range frequency pulsations under normal operation. Eliminating the low and medium frequency ranges will reduce the noise levels to less than 90 dBA and preferably less than 85 dBA on a time weighted average basis without the need of both reactive and passive silencers. Such operation may include operating the compressors so that they maintain operation at or near their peak efficiency. For example, situations can occur that cause a centrifugal compressor to move off its peak efficiency line and into a surge condition. This is a known condition and operating such compressors to avoid surge is discussed in commonly owned U.S. patent application Ser. No. 13/484,846, filed May 31, 2012. In this situation, a control system is required that is capable of detecting the surge condition or other operating abnormalities and adjusting the operation, such as to increase the compressor speed to avoid surge and stay on the peak efficiency line.

Positive displacement compressors in the form of compression machinery normally introduce these known pulsations into the fluid through the compression process. Positive displacement compressors include rotary or "Roots" blowers as well as reciprocating or screw compressors. The terms "eliminating" or "not generating" with respect to low, and preferably, low to medium, range frequency pulsations means that the noise emanating from the compressors in the low (<250 Hz) or, preferably, low to medium (250-500 Hz) frequency ranges is either completely absent or insignificant in that no silencer equipment is required for the frequency range of concern. Frequency pulsations generating noise levels of 15 dBA less than the overall noise level requirements of the user/operator are insignificant. Normally, the power level of the noise is detected using commercially available decibel meters or other noise detecting equipment. Relatively inexpensive handheld dBA meters measure noise levels to +/−1-2 dBA, and more expensive equipment can be used that provides accurate, reproducible readings to less than 0.5 dBA.

In a preferred embodiment herein, centrifugal compressors (as opposed to positive displacement compressors) driven by direct drive motors, as taught below, are used and provide two advantages. First, such direct drive compressors typically run faster than conventional positive displacement compressors (which require gear boxes/drive systems thereby generating few low frequency pulsations and overall noise). Second, the centrifugal machine can more easily be operated within a range of speeds that substantially eliminate both low and medium range frequency pulsations while still meeting the compression/evacuation requirements of the process. Based upon current technology, conventional positive displacement compressors having gear boxes and drives systems cannot operate under as wide conditions as centrifugal compressors thereby limiting their ability to operate at speeds that eliminate undesirable frequency pulsation while meeting the conditions required for this process.

Most preferred is the use of centrifugal compressors driven by high speed, direct drive permanent magnet motors or high speed induction motors with variable frequency drives which permit the compressor to cyclically accelerate from a low operating speed to a high operating speed and decelerate from a high operating speed to a low operating speed at rapid rates, as required by the prescribed process cycle times. These cycle times are generally less than one minute. These compressors are industrial grade with high air flows and capable of providing from ten to several hundred tons of product gas per day. The term "centrifugal compressors" is used herein to describe the operating machine which includes the centrifugal compressor (impeller, shroud and volute) as well as the motor/direct drive system. Both the permanent magnet and induction motors are capable of operating the compressors at high speeds of more than 1000 RPMs, which makes them preferred for achieving the operating speeds required to eliminate both low and medium frequency pulsations.

In the case of centrifugal compressors, each compressor is synchronized with the power requirements of the deceleration and acceleration (or re-acceleration) cycle steps (e.g. such that the power is disengaged during deceleration and only reengaged upon acceleration), but also controlled not to operate at speeds that generate these undesirable frequency pulsations. This is achieved by maintaining the operation of the compressor within a predetermined operating speed range for the specific compressor employed.

Table 1 below provides data that indicates how the frequencies change as a function of the variable (and controllable) speed of the compressor. For each compressor design, the actual speed and corresponding actual frequency is provided. These actual values were determined according to the following formulas:

Formula (1) describes the calculation for rotary lobe blowers;

$$f = N_R * N_L * \Theta / 60 \text{ (hertz)} \quad (1)$$

where;
f is the fundamental frequency of the blower
$N_R$ is the number of rotors
$N_L$ is the number of lobes; and
$\Theta$ is the number of revolutions of the lobes per minute Formula (2) describes the calculation for the centrifugal compressors;

$$f = M_s * Bc / 60 \text{ (hertz)} \quad (2)$$

where;
f is the fundamental frequency of the compressor
$M_s$ is the motor speed
Bc is the blade count The two compressor types are the rotary lobe type compressor and centrifugal type compressor. The rotary lobe type design involves the use of differing lobe counts (2 and 3 lobes as are most common); while the centrifugal compressor design involves the use of differing blade or vane counts (12, 15 and 17 blades). As is shown in Table 1, both the rotary lobe and the centrifugal compressors operate over a variety of speeds ranging from about 500 to about 5000 RPMs, although the centrifugal compressor can operate at speeds well in excess of 5000 RPMs.

TABLE 1

Speed Dependent Fundamental Frequencies for Centrifugal and Rotary-Type Compressors

| Compressor Type | Low range frequency 0-250 Hz Reactive and absorptive silencing required | Medium range frequency 250-500 Hz Absorptive silencing required | High range frequency >500 Hz No silencing required |
|---|---|---|---|
| 2-lobe rotary lobe/blower | <3750 RPM | 3750-7500 RPM | >7500 RPM |
| 3-lobe rotary lobe blower | <2500 RPM | 2500-5000 RPM | >5000 RPM |
| 12-blade centrifugal | <1250 RPM | 1250-2500 RPM | >2500 RPM |
| 15-blade centrifugal | <1000 RPM | 1000-2000 RPM | >2000 RPM |
| 17-blade centrifugal | <882 RPM | 882-1765 RPM | >1765 RPM |

Table 1 provides data for the operation of variations of two preferred types of compressors as measured by the fundamental frequencies generated as a result of compressor operation at various rotational speeds. These compressors are selected to represent variations of two common types of the compressors use to support a cyclic adsorption process and are only meant to be illustrative of the invention. One skilled in the art can test or measure any compressor for the frequency pulsations generated over its full range of operating speeds and use the formula provided above. Three frequency ranges are provided within Table 1; low (0-250 Hz), medium (250-500 Hz), and high (>500 Hz) together with the rotational speeds associated for these frequency ranges specifically for the selected compressor design. While these frequency ranges are shown as being distinct, the skilled person will understand that the ranges provided are within a continuous generated frequency spectrum.

FIG. 1 is a log-log plot which illustrates the operation of several embodiments of the two preferred types of compressors as measured by the fundamental frequencies generated as a result of compressor operation at various rotational speeds (partially provided in Table 1 above). The two compressor types shown in FIG. 1 correspond directly with the data provided in Table 1 for both a rotary lobe type compressor and centrifugal type compressor. The rotary lobe type design involves the use of differing lobe counts (2 and 3 lobes as are most common); while the centrifugal compressor design involves the use of differing blade or vane counts (12, 15 and 17 blades are common).

The low frequency range (frequencies not exceeding 250 Hz) generate excessively high vibrational, translational, and rotational modes of energy due to the pulsating volume of air entering and leaving the compressor. The compressed air or some residual thereof along with the aforementioned modes of energy will also move through piping on both the inlet and outlet sides of the compressor. These low frequency energy modes are primarily responsible for the noise level readings associated with operation of the cyclic adsorption plant. The power associated with the noise levels generated is normally measured using a weighted decibel scale such as dBA. It is desirable, and often required, to eliminate the noise caused by these low frequency energy modes and attenuating components/chambers of the reactive type systems discussed above.

Noise at the fundamental frequency of the compressor will have the greatest amount of energy. There will also be other frequencies of noise generated by the compressor. Because the pulsations from the compressor are periodic or cyclic, with a period of 1/f seconds, and because these pulsations are not purely sinusoidal, a Fourier series expansion of the pressure pulsations reveals that there are noise components at integer multiples of 1/f. Each of these higher harmonic frequencies (multiples of the fundamental frequency) is generated at a lower energy level than the principal (or fundamental) harmonic; however, the resultant noise levels are often appreciable and can further damage system components.

The medium frequency pulsations range is from about 250 Hz to about 500 Hz. Such frequency pulsations must also be attenuated to reduce vibrational and noise effects and are attenuated using sound absorbing type silencers. Medium range frequencies, while still having significant inherent noise power, are easier to attenuate with such passive attenuation and tend to dissipate more quickly than the low frequencies.

The high frequency range has frequencies above 500 Hz and provide minimum noise and vibration levels. They produce less stringent system design requirements. Operating within this frequency range allows the plant to operate without any silencing systems as the power of the noise associated with the compressor(s) is already at an acceptable level; below 85 dBA. Operation of a centrifugal compressor at operating speeds above about 2500 RPMs, for compressors with 12 blades respectively eliminates the need for any reactive or passive silencers. If necessary, these frequencies can be attenuated using simple absorbing systems.

The preferred centrifugal compressors are designed for variable-speed, direct drive operation and used for both pressurization and depressurization of a single adsorber vessel. Multiple adsorber vessel systems will often have separate compressors; one for feeding gas to the vessels and one for evacuating the vessels. These rapid pressures and gas flow changes require compressors which can rapidly adjust to the flow requirements of the process. Centrifugal compressors can operate at speeds from as low as 500 RPM to speeds of over 10000 RPM as required to meet the pressure/vacuum, air flow, and frequency requirements of the process. The centrifugal compressors used here typically have from 12 to 17 blades as may be commercially available. These compressors can be operated at speeds that do not generate low to medium frequency pulsations. For example and referring to FIG. 1, centrifugal compressors having 17 blades can be operated above 1785 RPM to avoid generating medium range frequencies. The use of high-speed permanent magnet variable-speed motors used to accelerate and decelerate centrifugal machines in cyclic adsorption processes can be operated under conditions which meet the operational requirements of the adsorption process, but still eliminate low and medium frequency pulsations.

Once operating in only the high frequency range, no silencers of either the reactive or passive types are required to maintain the noise level below 90 and more preferably below 85 dBA. Thus in the most preferred mode, the process is operated in the absence of either reactive or passive type silencers or silencer system.

It should be apparent to those skilled in the art that the subject invention is not limited by the examples or description provided herein. The scope of this invention includes equivalent embodiments, modifications, and variations that fall within the scope of the attached claims.

What is claimed is:

1. A cyclic adsorption process for separating components of a gas stream comprising:
at least one adsorber vessel containing at least one adsorber bed undergoing the steps of at least pressurization and depressurization wherein the steps are driven by at least one compressor wherein the compressor is operated at or above a predetermined speed which does not generate low range frequency pulsations.

2. The process of claim 1 which includes a controller for receiving data signals on the process conditions of the adsorption process and for communicating instructions to the at least the one compressor in response to the conditions to direct the at least one compressor to operate above the predetermined speed.

3. The process of claim 1 wherein the at least one compressor is operated above a predetermined speed which does not generate low and medium frequency pulsations.

4. The process of claim 1 conducted in the absence of a reactive type silencer.

5. The process of claim 1 conducted in the absence of an absorptive type silencer.

6. The process of claim 1 conducted in the absence of absorptive and reactive type silencers.

7. The process of claim 2 wherein the at least one compressor is a centrifugal compressor.

8. The process of claim 7 wherein the centrifugal compressor has a variable frequency drive in communication with the controller.

9. The process of claim 8 wherein the controller operates the centrifugal compressor above a predetermined speed that does not generate noise levels above 90 dBA.

10. The process of claim 7 wherein the centrifugal compressor does not generate low and medium frequency pulsations.

11. The process of claim 7 wherein the centrifugal compressor has a direct drive high speed, permanent magnet motor or a high speed induction motor.

12. The process of claim 3, wherein the In range frequency pulsations are less than 250 Hz and the medium range frequency pulsations are from 250 to 500Hz.

13. The process of claim 1 wherein the adsorption process includes the steps of adsorption, depressurization, purge and, pressurization.

14. The process of claim 1 wherein the adsorption process is selected from a PSA, VSA, and/or a VPSA cyclic adsorption process.

15. The process of claim 14 wherein the process, is an air separation process to produce oxygen from air.

16. A cyclic adsorption process for gas separation, the process comprising:
compressing a feed gas using at least one feed compressor;
introducing the feed gas into at least one vessel containing; at least one adsorber bed including at least one adsorbent material, the feed gas comprising at least one less readily adsorbable component and at least one more readily adsorbable component;
passing the feed gas through the at least one adsorbent material such that the more readily adsorbable component is adsorbed by the at least one adsorbent material; and
withdrawing a product gas enriched in the more readily adsorbable component using at least one vacuum compressor; and
wherein the feed compressor and the vacuum compressor are each operated at speeds eliminating low range frequency pulsations.

17. The process of claim 16 wherein the compressors are centrifugal compressors and do not generate low or medium frequency pulsations.

18. The process of claim 16 wherein the adsorption process is selected from a PSA, VSA, and VPSA cyclic adsorption process.

19. The process of claim 16 wherein the process is an air separation process to produce oxygen from air.

20. A cyclic adsorption process for gas separation using at least one centrifugal compressor, the process comprising:
compressing a feed gas;
introducing the feed gas into at least one vessel containing at least one adsorber bed including at least one adsorbent material, the feed gas comprising at least one less readily adsorbable component and at least one more readily adsorbable component;
passing the feed gas through the at least one adsorbent material such that the more readily adsorbable component is adsorbed by the at least one adsorbent material; and
withdrawing a product gas enriched in the more readily adsorbable component using at least one vacuum centrifugal compressor directly driven by a high-speed motor; and
wherein one or more of the steps of compressing or withdrawing is performed by the at least one centrifugal compressor operating at or above speeds that do not generate low and medium range frequency pulsations.

* * * * *

UNITED STATES PATENT AND TRADEMARK OFFICE
CERTIFICATE OF CORRECTION

| | | |
|---|---|---|
| PATENT NO. | : 8,968,444 B2 | Page 1 of 1 |
| APPLICATION NO. | : 13/761510 | |
| DATED | : March 3, 2015 | |
| INVENTOR(S) | : Pedro Berges et al. | |

It is certified that error appears in the above-identified patent and that said Letters Patent is hereby corrected as shown below:

In the Claims
Column 11, lines 44-46, in claim 12, line 1, "the In range frequency" should be --the low range frequency-- (therefore, claim 12 should read as follows):

12. The process of claim 3, wherein the low range frequency pulsations are less than 250 Hz and the medium range frequency pulsations are from 250 to 500Hz.

Signed and Sealed this
Twenty-second Day of September, 2015

Michelle K. Lee
*Director of the United States Patent and Trademark Office*